United States Patent [19]

Wachter

[11] Patent Number: 5,054,176
[45] Date of Patent: Oct. 8, 1991

[54] MACHINE TOOL AND CHUCKING ATTACHMENT AND TOOL HEAD THEREFOR

[76] Inventor: Franz Wachter, Heiligkreuz 47, Vaduz, 9490, Liechtenstein

[21] Appl. No.: 419,089

[22] Filed: Oct. 11, 1989

[30] Foreign Application Priority Data

Oct. 12, 1988 [WO] PCT Int'l Appl. ... PCT/EP88/00916

[51] Int. Cl.$^5$ .............................................. B23Q 1/08
[52] U.S. Cl. .......................................... 29/40; 82/121; 82/159
[58] Field of Search ...................... 29/35.5, 36, 40, 42, 29/39; 82/120, 121, 129, 159

[56] References Cited

U.S. PATENT DOCUMENTS

| 3,760,472 | 9/1973 | Kielma et al. | 29/40 |
| 3,830,584 | 8/1974 | Ohlig | 29/40 |
| 4,785,513 | 11/1989 | Lee et al. | 29/40 |
| 4,872,244 | 10/1989 | Schleich | 29/40 |
| 4,887,345 | 12/1989 | Saito et al. | 29/40 |

FOREIGN PATENT DOCUMENTS

| 111224 | 9/1899 | Fed. Rep. of Germany . | |
| 507013 | 8/1930 | Fed. Rep. of Germany . | |
| 543845 | 2/1932 | Fed. Rep. of Germany . | |
| 3035451A1 | 6/1952 | Fed. Rep. of Germany . | |
| 245146 | 5/1976 | Fed. Rep. of Germany . | |
| 3430380 | 2/1986 | Fed. Rep. of Germany . | |
| 2364092 | 4/1978 | France . | |
| 2486848 | 1/1982 | France | 82/117 |
| 58-102650 | 6/1983 | Japan . | |
| 623763 | 6/1981 | Switzerland . | |

Primary Examiner—Frederick R. Schmidt
Assistant Examiner—Blynn Shideler

[57] ABSTRACT

A machine tool has chuck means defining a geometric axis for holding a workpiece and turret means rotatable about an axis of rotation. The turret means includes at least one end surface, a peripheral surface and first fastening means distributed along a circle within a plane extending normally to the axis of the rotation and being adapted to fasten a tool by means of its fastening surface. At least one tool chucking attachment has a fastening surface to be fastened by the first fastening means instead of a tool head. The tool chucking attachment includes at least one second fastening means having fast-locking means for receiving the fastening surface of a tool head.

41 Claims, 5 Drawing Sheets

MACHINE TOOL AND CHUCKING ATTACHMENT AND TOOL HEAD THEREFOR

The invention relates to a machine tool, and in particular to a turning machine for machining workpieces by means of at least one of a plurality of headed tools having a fastening surface on the tool head and to a chucking attachment and a tool head therefor.

BACKGROUND OF THE INVENTION

For the purposes of the present invention, "fastening means" are "connections", "chucking attachments" are "tool head holders" and "tool heads" are "tool holders".

Many turning machines which have a fast-action lock for rapid change of tools are available on the market. Many different designs have also been proposed for this purpose, of which one designated as VDI chucking system has become particularly widespread. The term "turning machine" is now understood as meaning processing machine in which there is a relative rotation of workpiece and/or tool to achieve machining. It is known per se that the tools can e arranged on a turret, so that change can be effected more rapidly. The disadvantage of all these designs, however, is that the number of tools to be connected is generally limited.

PRIOR ART

Although German Auslegeschrift 2,341,999 discloses a multiple tool holder, this is intended for only a very limited field of use, namely for plunge-cutting of circular grooves with the aid of two tools which essentially point in the same direction and are intended to act on a workpiece in succession.

U.S. Pat. No. Re 29,612 describes a turret on whose peripheral surface tool holders can be fastened by means of a plurality of screws (generally four). Here, it is not possible either to remove the tool holders rapidly or to mount a number of tools over and above the number of fastening points for tool holders.

For many tools, a tool head is provided which is either fastened to the tool or detachably connected to it, and which is fastened to the tool holder.

German Offenlegungsschrift 3,430,380 describes an interchangeable tool head having a plurality of chucks for detachable fastening of a plurality of tools. However, the chucks are unsuitable for rapid changing of tools because the correct position of the tool and its projecting length must be adjusted by a tedious procedure in the chuck itself, which is correspondingly labor-intensive. Particularly for NC machines which have numerical control for automatic machining, tools having predetermined masses and dimensions are therefore generally used, as well as the stated fast-action locks. German Offenlegungsschrift 3,202,042 describes a similar situation. The tool head there is inserted directly into the turret head and has a chuck for holding a tool.

Nevertheless, in many cases a "0" production pass is necessary to permit the correct tool setting or machine setting for a special workpiece.

Finally, FR-A-2 486 848 discloses that a turret head can be provided with reception holes running continuously from one face to the other for fastening tools. However, it is only possible to fasten a tool alternately at one end face or the other but not to equip both end faces simultaneously with tools, for example to machine two opposite end faces of a groove immediately after one another without change-over time.

Another problem in machine tools is the precision which is generally present but not very great. If, however, it is desired to machine pieces with relatively high dimensional stability, special machines which are expensive to acquire and are generally little used are required.

Alternatively, such deficiencies can be eliminated only by expensive computer programs which cannot be used for many NC machines.

OBJECT AND STATEMENT OF THE INVENTION

It is therefore the object of the invention to improve a machine tool of the type stated at the outset in such a way that, on the one hand, tool change can be carried out rapidly, and either a larger number of tools can be kept in readiness, avoiding a long change-over time and furthermore machining time, and/or to increase the machining precision—even in existing machine tools—without higher capital costs being necessary for this purpose.

This object is achieved, according to the invention, by the following features:
chuck means for defining a geometric access for holding a workpiece;
turret means rotatable about an axis of rotation, said turret means including
at least one end surface, and
a peripheral surface,
first fastening means distributed along a circle within a plane extending normally to said axis of rotation and being adapted to fasten one of a plurality of headed tools by means of its fastening surface;
at least one tool chucking attachment having a fastening surface to be fastened by said first fastening means instead of a tool, said tool chucking attachment including
at least one second fastening means having fast-locking means for receiving the fastening surface of said tool head.

These features allow each chucking attachment coordinated with a fastening means to be adjusted individually with respect to the fastening means and the turret head acid so that its individual fastening means, namely the further fastening means of the chucking attachment, lies precisely on a circle through which all tools pass on rotation of the turret head. This means that its geometric dimensions with respect to the machining axis (5, 5') can each be positioned at an exactly defined point. The chucking attachment thus serves as an adapter between a conventional turret head and a conventional tool head and compensates for any lack of precision of the turret head. In the simplest case, adjustment can be carried out with the aid of shims; however, it is also possible to adopt an arrangement such that the fastening parts for fastening to the turret head, which are present on the chucking attachment, are equipped with adjustment cams to permit exact alignment. The entire chucking attachment can of course also be produced individually, in particular according to the following features:
an elongated body of at least approximately prismatic shape, the body having first and second ends in a sufficient distance from each other to extend said first end beyond the peripheral surface of a tool turret when mounted on it, said body comprising a support surface portion to be applied against the end surface of the tool turret, and a further surface portion facing away from said support surface portion, first and second tool bearing surface portions within the region of said first end of said elongated body, said tool bearing surface portions facing away from each other and extending parallel to or flush with said support surface portion, a peg-like extension projecting at right angles from said support surface portion within the region of said second end, and having at least one fastening surface to be inserted into one of said tool receiving holes;

first and second tool holding means on said first and second tool bearing surface portions, respectively, to connect a headed tool onto each of said tool bearing surface portions, said tool holding means each including fast-locking means; and at least one means forming a fluid line on said elongated body, said means extending from the region of said first end to the region of said second end, and including line coupling means within the region of said second end.

Said fluid line is a lubricating line.

Said fluid line comprises a feed section and a return section.

The chucking attachment further comprises fluidic drive means on said fluid line.

Said fluidic drive means are to actuate said fast-locking means.

Said fluid line comprises at least one control valve for controlling the rate of fluid flow.

The above advantages also apply to the following embodiment where the essential feature is that power transmission is also possible via the chucking attachment:

first tool drive means within the region of said first fastening means, said tool chucking attachment comprising second tool drive means extending to the region of said second fastening means, and coupling means for coupling said first and second tool drive means.

Even when the following features are implemented, the advantages of greater precision can be realized, and also the provision of a larger number of tools, which can be used without change-over time;

said chucking attachment extends radially beyond said peripheral surface of said turret means and comprises a radially inner and an outer end, first and second surfaces extending from one end to the other in opposite relationship so as to face away from one another, said fastening surface of the chucking attachment being arranged within the region of said radially inner end on the first surface, while said second fastening means together with said fast-locking means are on the radially outer end and are arranged on said second surface to hold one of said tools substantially parallely to said axis of rotation.

The above mentioned features thus have in common the fact that an additional chucking attachment can be fastened to the fastening means on the turret head, which additional chucking attachment in turn carries fastening means for a tool holder or a tool head and by means of which the tool can be positioned more exactly at a preselected point. This is particularly advantageous in the conversion of existing machine tools, for example including grinding or planing machines with reciprocating movement, but generally turning machines, which can now be converted to greater precision and cost-efficiency without high capital costs. Through the last mentioned features, furthermore, the number of tools to be carried by a turret is increased in that its existing fastening means are multiplied by the chucking attachment, and, owing to the embodiment with fast-acting locks, rapid tool change is possible here too. Thus, a chucking attachment can be fully equipped during operation of the machine and then need only be connected to the fastening means of the turret. It is not at all necessary for the chucking attachment to have only the two fast-acting locks; for example, it may itself be in the form of a turret, which then fits into a larger turret. Machining operations which are carried out in succession with a plurality of tools can thus be carried out more rapidly since a small (additional) turret is of course more convenient to handle. With an appropriate embodiment of the control, it is even possible to process two workpieces simultaneously, or at least rapidly in succession.

Machining in two opposite directions is also possible.

However, the precision and speed is also increased as a result of the following features, with simultaneous reduction in the change-over time as a result of dispensing with tedious adjustment and dimensioning:

numerical control means for automatically controlling a relative movement of one of said tools and one of said workpieces, code means on said tool head for indicating at least one particular tool dimension, and code reading means for determining the exact position of the tool when considering said tool dimension, said code reading means being connected to said numerical control means.

By means of three features, the tool dimensions, which finally specify the position of the tool relative to the workpiece, can be automatically communicated to the control without manual input being necessary for this purpose.

A chucking attachment according to the invention is characterized by the following features:

an elongated body of at least approximately prismatic shape, the body having two ends in a sufficient distance from each other to extend beyond said peripheral surface of said tool turret when mounted on it, said body comprising a support surface portion to be applied against said end surface, and a further surface portion facing away from said support surface portion, first and second tool bearing surface portions within the region of one of said ends of said elongated body, said tool bearing surface portions facing away from each other and extending parallely to or flushing with said support surface portion, a peg-like extension projecting at right angles from said support surface portion within the region of the other one of said ends, and having at least one fastening surface to be inserted into one of said tool receiving holes;

first and second tool holding means on said first and second tool bearing surface portions, respectively, to connect a headed tool onto each of said tool bearing surface portions, said tool holding means each including fast-locking means.

A tool head according to the invention is characterized by the following features:
- at least one tool receiving orifice and a clamping member on it, said head comprising
- a projecting insertion means for insertion into said tool receiving orifice, said projecting insertion means including an annular neck groove for engagement with said clamping member.

By inserting an additional part in between, namely the chucking attachment, in addition to the tool head, those skilled in the art presume that noise would be produced through vibrations in the course of machining and in this connection there were also some reservations about the practical use of the invention. It is surprising that the invention has, on the contrary, even led to a reduction in operating noise. In retrospect, the only explanation for this is that the individual connections via the fastening means are rigid enough to combine the individual parts into an overall integral part; however, since each of the individual parts has its own different frequency, the tendency for vibration noise decreases.

DESCRIPTION OF THE DRAWINGS

Further details of the invention are described in the following description of embodiments shown schematically in the drawing.

FIG. 3 shows another embodiment of the chucking attachment, in a view corresponding to line III—III of FIG. 2, partly in vertical section, of which

Figure 1:
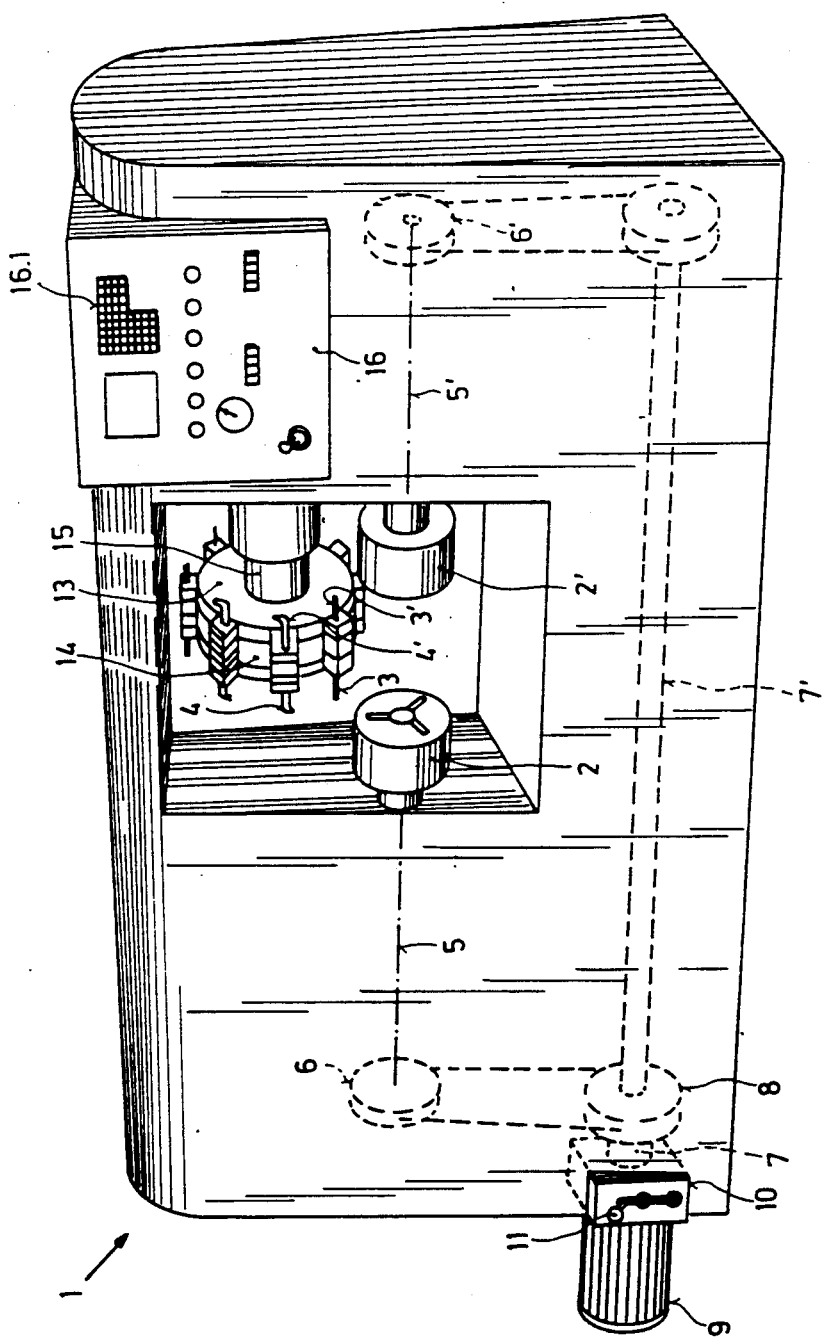
FIG. 1 shows a perspective view of a turning machine according to the invention
Figure 2:
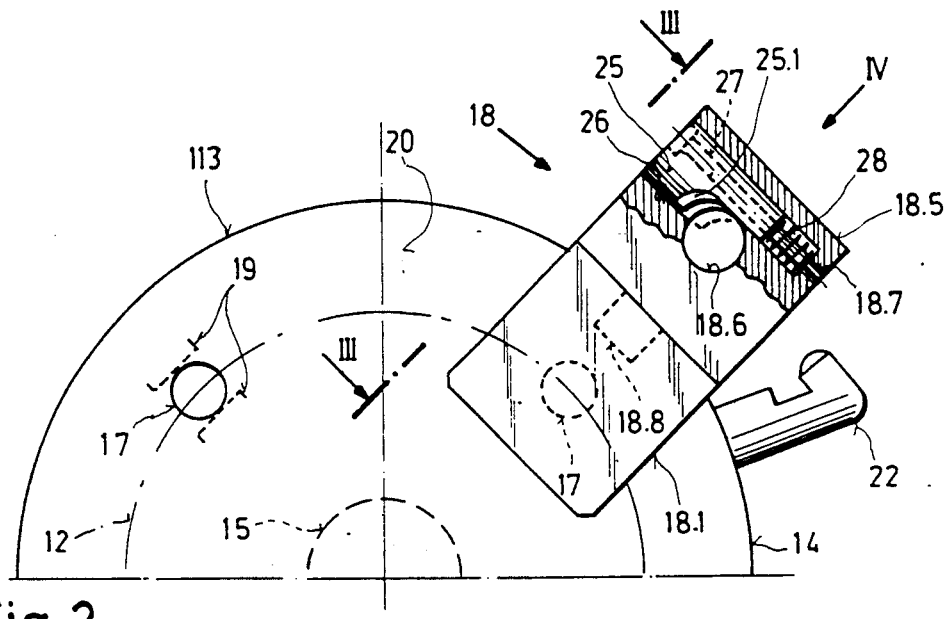
FIG. 2 shows an end view of a tool turret with a mounted chucking attachment according to a first embodiment.
Figure 3:
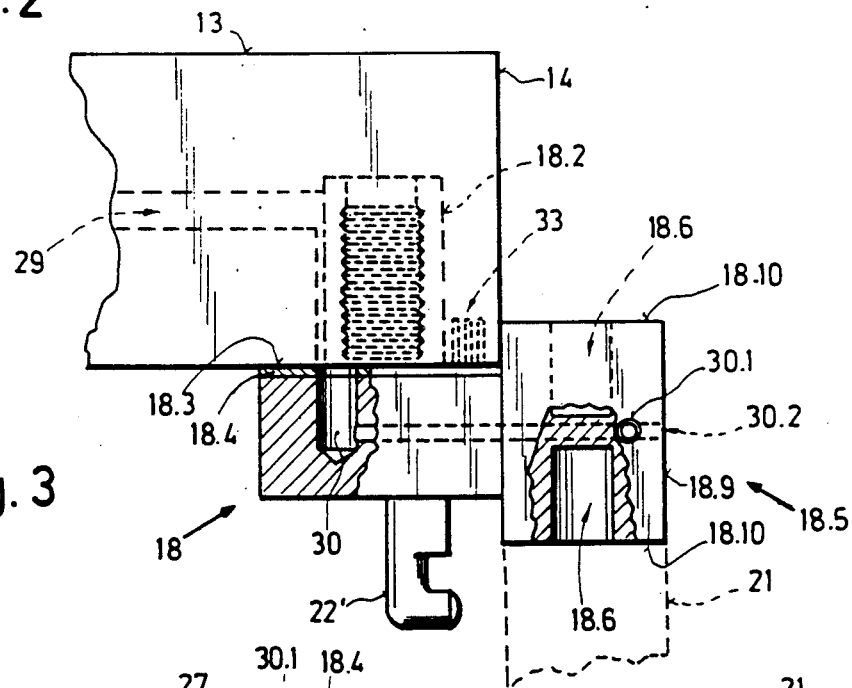
Figure 4:
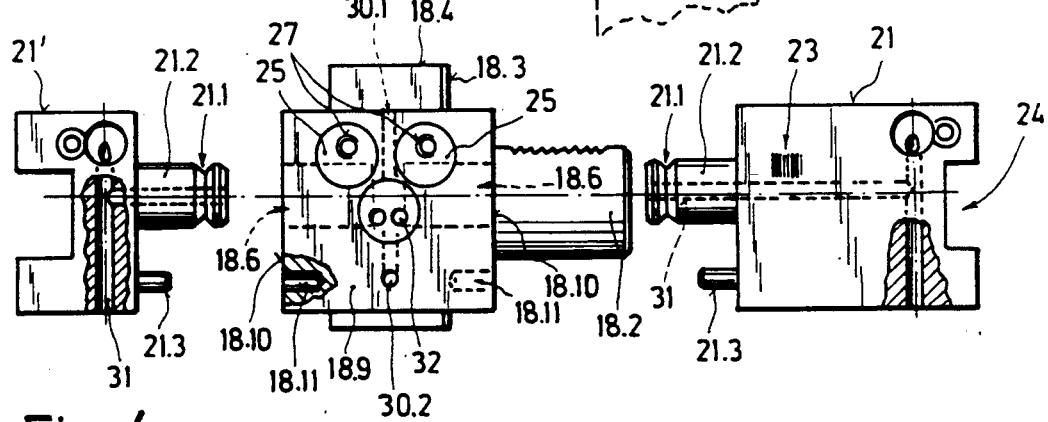
FIG. 4 shows a view corresponding to the arrow IV of FIG. 2 but illustrates the embodiment according to FIG. 3 including two associated tool heads in an exploded view.
Figure 5:
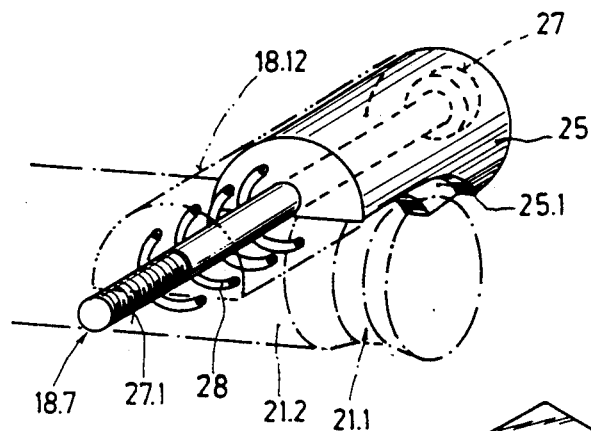
FIG. 5 shows a detail from FIG. 2, which illustrates the fast-acting lock in axonometric representation.
Figure 6:
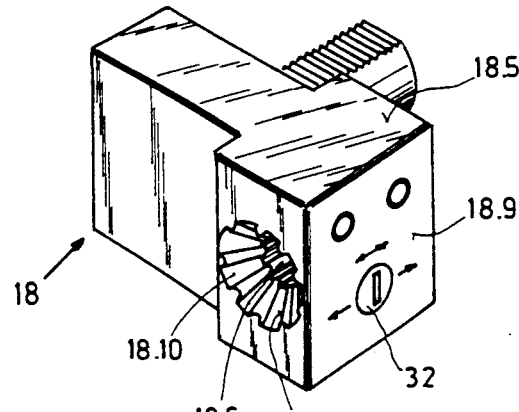
FIG. 6 shows an axonometric view of a modified embodiment of the chucking attachment with a conical coupling surface for the tool head.
Figure 7:
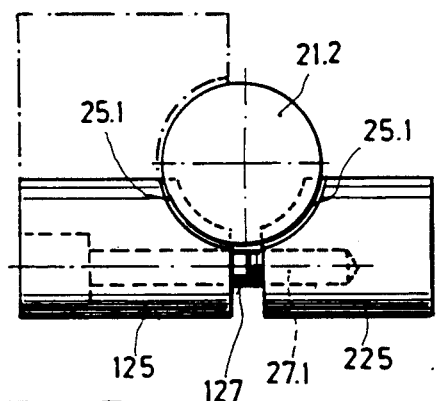
FIG. 7 shows a variant of the fast-acting lock according to FIG. 5.
Figure 8:
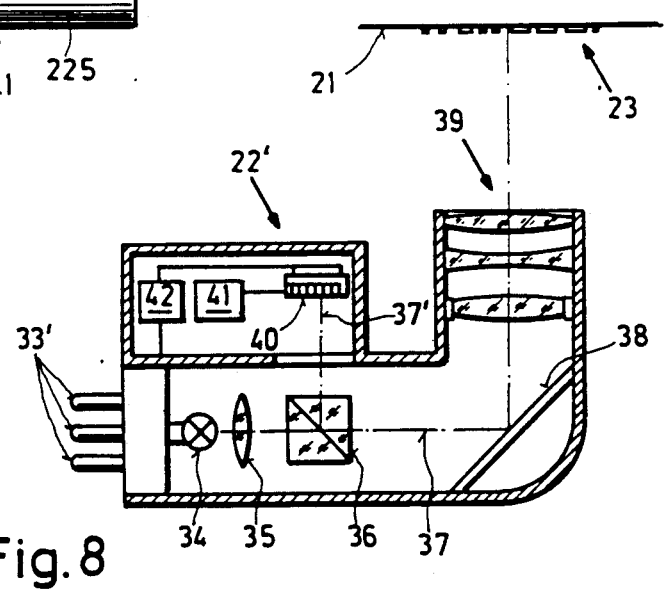
FIG. 8 shows a section through an optical reader for a tool code.
Figure 5A:
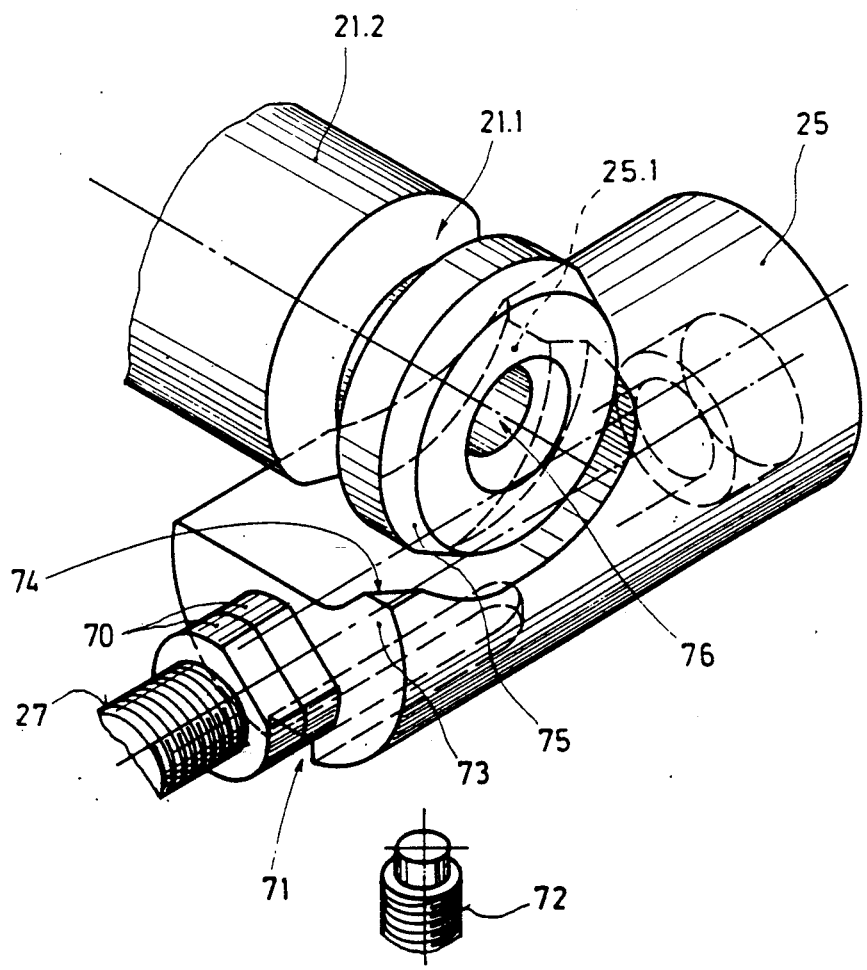
Figure 9:
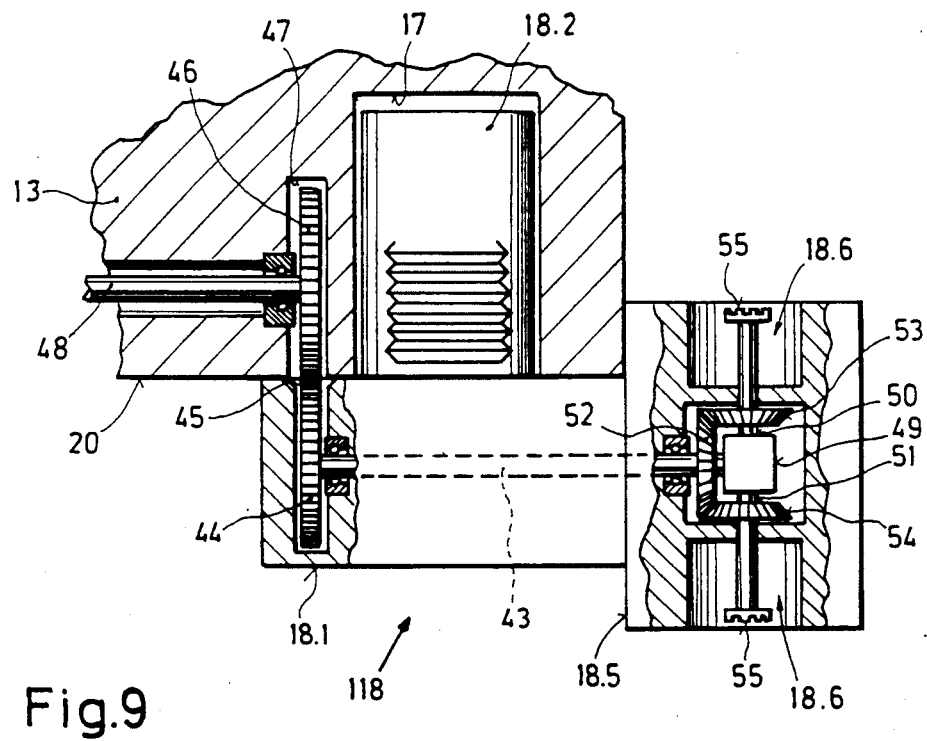
FIGS. 9 and 10 each show a modified embodiment of a chucking attachment in a section similar to FIG. 3 but somewhat magnified.
Figure 10:
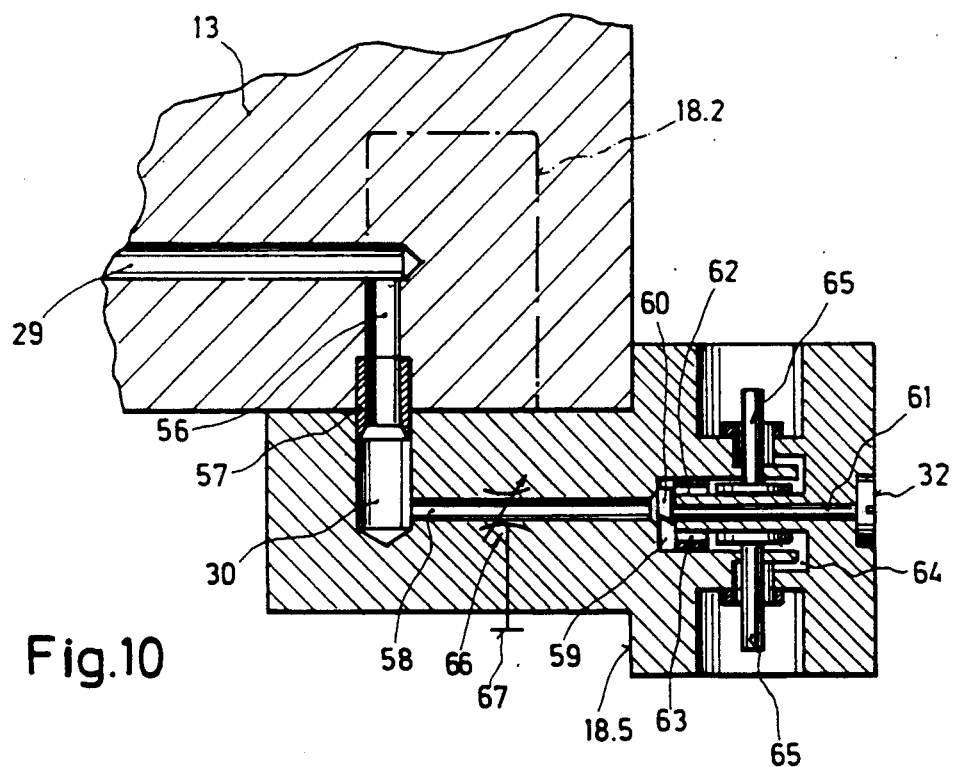

A turning machine 1 (FIG. 1) has a conventional chuck 2, in which a workpiece can be clamped, and tools 3, 4 which serve for machining such a workpiece. The workpiece is rotatable via the chuck 2 with the aid of a drive shaft 5, for example, to permit execution of a plunge cut by means of the tool 4. The drive shaft 5, which is indicated merely by a dash-dot line, carries at its other end a drive wheel 6 which is driven by a wheel 8 on a hollow shaft 7. The wheel 8 is connected to a drive motor 9 via a switchable coupling 10, whose switch lever 11 can be brought into three different positions, the hollow shaft 7 being coupled in the uppermost position shown, a shaft 7′ passing through the shaft 7 also being connected in a middle position and only the said shaft 7′ being connected in the lowermost switch.

I claim:

1. A machine tool for machining workpieces by means of at least one of a plurality of headed tools having a fastening surface on a tool head, the machine tool comprising
   chuck means defining a geometric axis for holding said workpiece;
   turret means rotatable about an axis of rotation, said turret means including
   at least one end surface,
   a peripheral surface, and
   first fastening means distributed along a circle within a plane extending normally to said axis of rotation and being adapted to fasten one of said tools by means of its fastening surface; and
   at least one tool chucking attachment having a fastening surface to be fastened by said first fastening means instead of a tool, said tool chucking attachment including at least one second fastening means having fast-locking means for receiving said fastening surface of said tool head,
   said chucking attachment extending radially beyond said peripheral surface of said turret means and comprising
   a radially inner and an outer end, and
   first and second surfaces extending from one end to the other in opposite relationship so as to face away from one another,
   said fastening surface of said chucking attachment being arranged within the region of said radially inner end on said first surface, while said second fastening means together with said fast-locking means are on said radially outer end and are arranged on said second surface to hold one of said tools substantially parallel to said axis of rotation.

2. A machine tool as claimed in claim 1, wherein said chuck means are rotatable about said geometrical axis.

3. A machine tool as claimed in claim 1, wherein said geometrical axis and the axis of rotation are parallel to each other.

4. A machine tool as claimed in claim 1, further comprising
   first tool drive means within the region of said first fastening means,
   said tool chucking attachment comprising second tool drive means extending to the region of said second fastening means, and
   coupling means for coupling said first and second tool drive means.

5. A machine tool as claimed in claim 1, wherein said first and second fastening means extend parallely to each other.

6. A chucking attachment for a machine tool having a tool turret with a peripheral surface and an end-surface and a plurality of tool receiving holes distributed along a circle over said end-surface, the attachment comprising
   an elongated body of at least approximately prismatic shape, the body having two ends in a sufficient distance from each other to extend beyond said peripheral surface of said tool turret when mounted on it, said body comprising a support surface portion to be applied against said end surface, and
   a further surface portion facing away from said support surface portion,
   first and second tool bearing surface portions within the region of one of said ends of said elongated body, said tool bearing surface portions facing away from each other and extending parallely to or flushing with said support surface portion, a peg-like extension projecting at right angles from said support surface portion within the region of the other one of said ends, and having at least one fastening surface to be inserted into one of said tool receiving holes;

first and second tool holding means on said first and second tool bearing surface portions, respectively, to connect a headed tool onto each of said tool bearing surface portions, said tool holding means each including fast-locking means.

7. A chucking attachment for a machine tool having a tool turret with a peripheral surface and an end-surface and a plurality of tool receiving holes distributed along a circle over said end-surface, the attachment comprising an elongated body of at least approximately prismatic shape, the body having two ends in a sufficient distance from each other to extend beyond said peripheral surface of said tool turret when mounted on it, said body comprising
a support surface portion to be applied against said end surface, and
a further surface portion facing away from said support surface portion;

a crossbeam arranged at right angles on said elongated body and having first and second tool bearing surface portions within the region of one of said ends of said elongated body, said tool bearing surface portions facing away from each other and extending parallely to said support surface portion;

a peg-like extension projecting at right angles from said support surface portion within the region of the other one of said ends, and having at least one fastening surface to be inserted into one of said tool receiving holes;

first and second tool holding means on said first and second tool bearing surface portions, respectively, to connect a headed tool onto each of said tool bearing surface portions, said tool holding means each including fast-locking means for quickly fastening and detaching a tool.

8. A chucking attachment for a machine tool having a tool turret with a peripheral surface and an end-surface and a plurality of tool receiving holes distributed along a circle over said end-surface, the attachment comprising an elongated body of at least approximately prismatic shape, the body having a longitudinal axis first and second ends in a sufficient distance from each other to extend said first end beyond said peripheral surface of said tool turret when mounted on it, said body comprising a support surface portion to be applied against said end surface, and a further surface portion facing away from said support surface portion, turret means rotatably supported about an axis of rotation on said first end, the axis of rotation being parallel to or flushing with the longitudinal axis of said elongated body, said turret means comprising at least first and second tool bearing surface portions;

a peg-like extension projecting at right angles from said support surface portion within the region of said second end, and having at least one fastening surface to be inserted into one of said tool receiving holes;

first and second tool holding means on said first and second tool bearing surface portions, respectively, to connect a headed tool onto each of said tool bearing surface portions, said tool holding means each including fast-locking means.

9. A chucking attachment as claimed in claim 8, further comprising drive means within said elongated body for driving one of said tools and including coupling means for engagement with corresponding coupling means of the machine tool in order to be connected with a drive of the machine tool, and a drive connection situated within the region of at least one of said tool bearing surface portion to impart drive to one of said tools.

10. An attachment as claimed in claim 9, wherein said coupling means are located within the region of said peg-like extension.

11. An attachment as claimed in claim 9, wherein said drive means comprises an angled gear for driving a transverse shaft within the region of said drive connection.

12. An attachment as claimed in claim 11, wherein said angled gear comprises conical gear wheels.

13. A chucking attachment for a machine tool having a tool turret with a peripheral surface and an end-surface and a plurality of tool receiving holes distributed along a circle over said end-surface, the attachment comprising an elongated body of at least approximately prismatic shape, the body having two ends in a sufficient distance from each other to extend beyond said peripheral surface of said tool turret when mounted on it, said body comprising
a support surface portion to be applied against said end surface, and
a further surface portion facing away from said support surface portion,
first and second tool bearing surface portions within the region of one of said ends of said elongated body, said tool bearing surface portions facing away from each other and extending substantially parallely to or flushing with said support surface portion, and including coupling surfaces to secure a respective tool in a predetermined rotational position, a peg-like extension projecting at right angles from said support surface portion within the region of the other one of said ends, and having at least one fastening surface to be inserted into one of said tool receiving holes;

first and second tool holding means on said first and second tool bearing surface portions, respectively, to connect a headed tool onto each of said tool bearing surface portions, said tool holding means each including fast-locking means.

14. An attachment as claimed in claim 13, wherein said coupling surfaces have extensions and indentations for holding corresponding indentations and extensions of the tool head.

15. An attachment as claimed in claim 14, wherein said extensions are in the form of ribs.

16. An attachment as claimed in claim 15, wherein said tool holding means comprise each a tool receiving hole, said ribs being arranged as radii with respect to said tool receiving hole.

17. An attachment as claimed in claim 13, wherein said coupling surfaces are different from a flat surface.

18. An attachment as claimed in claim 13, wherein said coupling surfaces are substantially conical.

19. A chucking attachment for a machine tool having a tool turret with a peripheral surface and an end-surface and a plurality of tool receiving holes distributed along a circle over said end-surface, the attachment comprising an elongated body of at least approximately prismatic shape, the body having first and second ends in a sufficient distance from each other to extend said first end beyond said peripheral surface of said tool turret when mounted on it, said body comprising a support surface portion to be applied against said end surface, and a further surface portion facing away from said support surface portion, first and second tool bearing surface portions within the region of said first end of said elongated body, said tool bearing surface portions facing away from each other and extending parallely to or flushing with said support surface portion, a peg-like extension projecting at right angles from said support surface portion within the region of said second end, and having at least one fastening surface to be inserted into one of said tool receiving holes;

first and second tool holding means on said first and second tool bearing surface portions, respectively, to connect a headed tool onto each of said tool bearing surface portions, said tool holding means each including fast-locking means; and at least one means forming a fluid line on said elongated body, said means extending from the region of said first end to the region of said second end, and including line coupling means within the region of said second end.

20. An attachment as claimed in claim 19, wherein said fluid line is a lubricating line.

21. An attachment as claimed in claim 19, wherein said fluid line comprises a feed section and a return section.

22. An attachment as claimed in claim 19, further comprising fluidic drive means on said fluid line.

23. An attachment as claimed in claim 19, wherein said fluidic drive means are to actuate said fast-locking means.

24. An attachment as claimed in claim 19, wherein said fluid line comprises at least one control valve for controlling the rate of fluid flow.

25. A chucking attachment for a machine tool having a tool turret with a peripheral surface and an end-surface and a plurality of tool receiving holes distributed along a circle over said end-surface for inserting an elongated portion of a head of a headed tool, the attachment comprising an elongated body of at least approximately prismatic shape, the body having two ends in a sufficient distance from each other to extend beyond said peripheral surface of said tool turret when mounted on it, said body comprising a support surface portion to be applied against said end surface, and a further surface portion facing away from said support surface portion, first and second tool bearing surface portions within the region of one of said ends of said elongated body, said tool bearing surface portions facing away from each other and extending parallely to or flushing with said support surface portion, a peg-like extension projecting at right angles from said support surface portion within the region of the other one of said ends, and having at least one fastening surface to be inserted into one of said tool receiving holes;

first and second tool holding means on said first and second tool bearing surface portions, respectively, to connect a headed tool onto each of said tool bearing surface portions, said tool holding means each including fast-locking means including a wedge surface displaceable in transverse direction along an axis of movement with respect to the respective tool holding means to clamp said head portion in axial direction of its elongated portion, and actuating means for displacing said wedge surface.

26. An attachment as claimed in claim 25, wherein said actuating means comprises screw means having at least one threaded section.

27. An attachment as claimed in claim 26, wherein said screw means has its axis arranged eccentrically with respect to the axis of movement of said wedge surface.

28. An attachment as claimed in claim 26, wherein said screw means comprises two threaded sections of opposite pitch.

29. An attachment as claimed in claim 25, wherein said wedge surface is arranged on a sliding peg.

30. An attachment as claimed in claim 29, wherein said sliding peg is, at least in part, cylindrical.

31. An attachment as claimed in claim 26, wherein said actuating means comprise internal thread means for engagement with the threaded section of said screw means, said threaded section being arranged at the end of said screw means.

32. An attachment as claimed in claim 25, wherein said actuating means comprise means positively displacing said wedge surface to clamp said head portion, and spring means for releasing said head portion.

33. An attachment as claimed in claim 25, wherein said actuating means comprise a wedge bearing member, flange means on said wedge bearing member, the wedge surface being provided on said flange, thus forming at least a quadrant, but being smaller than a semicircle.

34. An attachment as claimed in claim 25, wherein said wedge surface is displaceable in longitudinal direction of said elongated body.

35. An attachment as claimed in claim 34, wherein said actuating means ending on an end surface on said one end of said elongated body to be parallel to the longitudinal direction of said body and to be accessible from said end surface.

36. An attachment as claimed in claim 25, wherein said tool holding means comprise ejector means to eject the respective tool, when said fast-locking means are released.

37. An attachment as claimed in claim 36, wherein said wedge surface comprises an ejector surface on its end, said ejector surface pushing the tool out of the tool holding means when clamping engagement of said wedge surface is released.

38. An attachment as claimed in claim 37, wherein said wedge surface and said ejector surface surround the elongated portion of said tool head when inserted so that with displacement in one direction the wedge surface clamps the headed tool, whereas with displacement in the other direction the ejector surface pushes the tool out of the tool holding means.

39. An attachment as claimed in claim 25, further comprising shim means for adapting at least one of said fastening means to chucking attachments of different dimensions.

40. A tool head for a machine tool for fastening the head onto fastening means of the machine tool, including at least one tool receiving orifice and a clamping member on it, said head comprising a projecting insertion means for insertion into said tool receiving orifice, said projecting insertion means including an annular neck groove for engagement with said clamping member.

41. A machine tool for machining workpieces by means of at least one of a plurality of headed tools having a fastening surface on a tool head, the machine tool comprising chuck means defining a geometric axis for holding said workpiece;

turret means rotatable about an axis of rotation, said turret means including
at least one end surface,
a peripheral surface, and
first fastening means distributed along a circuit within a plane extending normally to said axis of rotation and being adapted to fasten one of said tools by means of its fastening surface; and at least one tool chucking attachment having a fastening surface to be fastened by said first fastening means instead of a tool, said tool chucking attachment including at least one second fastening means having fast-locking means for receiving said fastening surface of said tool head, an elongated body, drive means within said elongated body for driving one of said tools and including coupling means for engagement with corresponding coupling means of the machine tool in order to be connected with a drive of the machine tool, and a drive connection situated within the region of at least one of said tool bearing surface portions to impart drive to one of said tools.

* * * * *